United States Patent Office 3,568,420
Patented Mar. 9, 1971

3,568,420
HYDRAULIC LIFTING APPARATUS FOR THE CUTTING PLATFORM OF HARVESTING MACHINERY
Friedrich-Wilheim Höfer, Hofingen, and Gerhard Nonnenmacher, Korntal, Germany, assignors to Robert Bosch GmbH, Stuttgart, Germany
Filed Dec. 23, 1968, Ser. No. 786,074
Claims priority, application Germany, Dec. 28, 1967,
P 15 82 161.1
Int. Cl. A01d 67/00
U.S. Cl. 56—208        21 Claims

ABSTRACT OF THE DISCLOSURE

A linkage which interconnects the hydraulic control, the cutting platform, and a manual setting lever, to set cutting platform height over ground level, includes a first variable link element changeable in length in response to pressure changes in the hydraulic lifting cylinder for the cutting platform, and a second link element responsive to the position of the cutting platform with respect to the machine, so that the cutting platform will be at even height above ground level regardless of weight on the cutting platform and undulations in ground level.

---

The present invention relates to hydraulic lifting apparatus for harvesting machinery to lift, and lower the cutting platform on which mowing or sickle bars are attached, and more particularly to mowing and threshing machine combines having a hydraulic pump furnishing operating pressure to a cylinder-piston combination which supports the major part of the cutting platform of the machine. The harvesting machine is provided with a manual lever to set a hydraulic controller which is responsive to the manual setting, as well as to the pressure in the cylinder-piston combination; the controller is, in turn, connected to a pump supplying operating pressure and to a reservoir for hydraulic fluid.

Hydraulic vertical adjustment apparatus, that is adjustment to lift and lower the cutting platform of harvesting machinery is known (see French Pat. 1,400,422) and more particularly machinery having a hydraulic control element including a control piston, the position of which varies in response to pressure in the lifting cylinder-piston combination for the cutting platform. The lower part of the cutting platform has fixed support elements which slide over the ground together with the cutting platform, so that a portion of the weight of the cutting platform itself is supported directly on ground level. Such a lifting arrangement has the disadvantage that the cutting platform is always in contact with the ground, and height adjustment, to accomodate different cutting heights cannot readily be made without additional attachments. If the cutting platform is out of contact with the ground, then the entire weight is carried by the lifting cylinder-piston combination. Large pressures will then act on the control piston within the control unit and the control unit must therefore be so constructed that it can accept the increased pressures or, alternatively, additional hydraulic apparatus must be provided in order to reduce the hydraulic forces acting on the control piston in the hydraulic controller itself. Such additional hydraulic apparatus interferes with the accuracy of control.

It is an object of the present invention to provide a hydraulic lifting arrangement for the cutting platforms of harvesting combines in which the cutting height of the mowing bar can be controlled for any desired cutting height and in which the lift of the hydraulic apparatus is automatically controlled so that optimum operating conditions are obtained.

Subject matter of the present invention

A control linkage interconnects the hand lever, and the control linkage includes an element which changes in length in dependence on the hydraulic pressure in the lifting cylinder-piston combination and further includes a second link element which is controlled by the position of the cutting platform with respect to the combine itself, and thus with respect to ground level.

The element which changes in length depending on pressure in the lifting cylinder is, preferably, so arranged in the linkage that, upon increase of pressure in the lifting cylinder, change in length of the linkage causes a change in the setting of a control piston in the hydraulic control unit. The pressure-sensitive element also, preferably, includes a pressure chamber, connected by means of a control line to the lifting cylinder, and further by means of linkage to the control piston of the control unit. The second link element may be fixed to the cutting platform at one end, and movably connected to the length-variable pressure-responsive element at the other end.

If it is desired to obtain a particularly uniform cutting height, and especially when the cutting platform is separated from ground level by only a small height, then movable feelers may be attached to the cutting platform which are then connected to the length-variable element, or otherwise into the control apparatus or the linkage system in order to maintain even cutting height over ground level.

Control may also be obtained electrically, by utilizing electrical transducers to obtain electrical signals corresponding to cutting height, pressure in the various hydraulic lines or control elements, and then interconnecting the electrical system with an electric-hydraulic servo to operate on the hydraulic portion of the lifting arrangement for the cutting platform.

The structure, organization, and operation of the invention will now be described more specifically with reference to the accompanying drawings, wherein.

Figure 1:
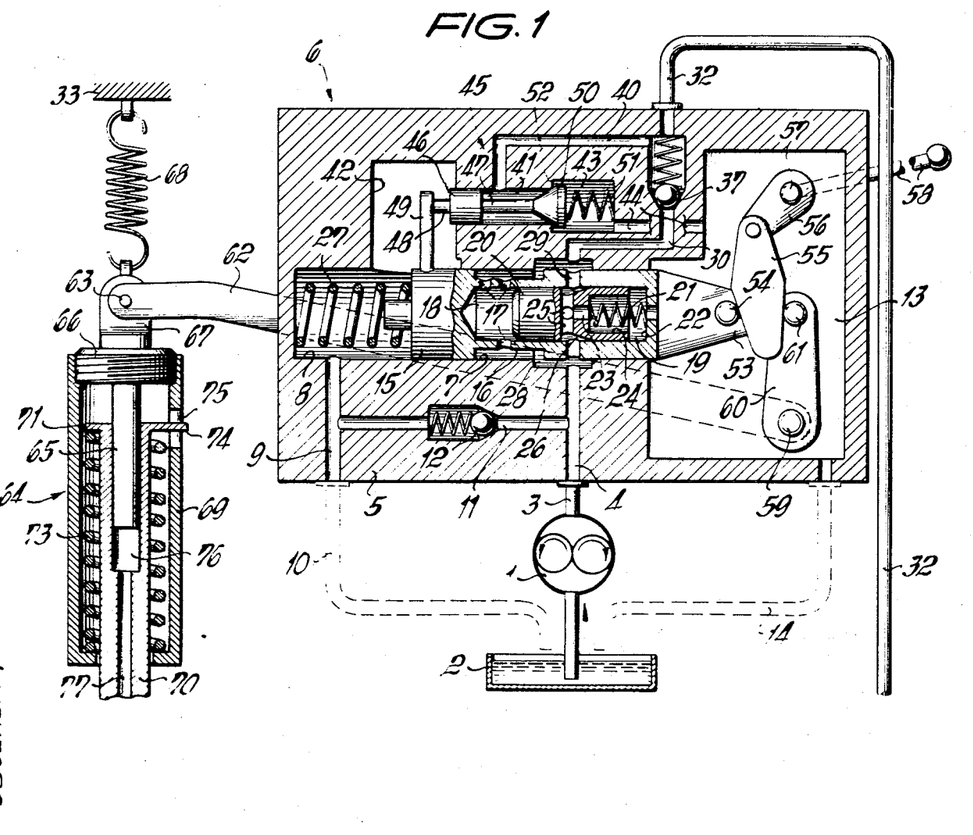
FIGS. 1 and 1a, taken together, are a schematic illustration of the cutting platform of a harvesting machine, combined with a detailed cross-sectional, schematic illustration of the hydraulic fluid controller and interconnecting linkages.
Figure 1A:
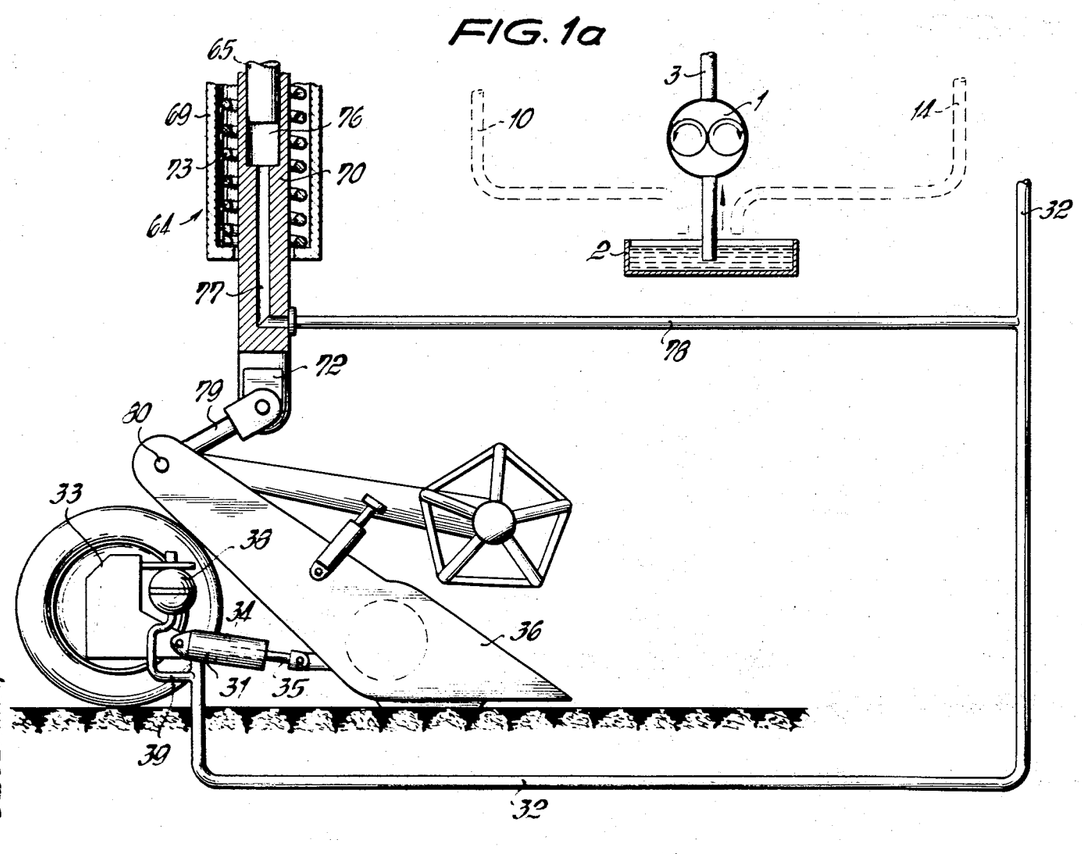

Referring first to FIG. 1: The harvesting machine, of which only the parts necessary for an understanding of the present invention are shown, has a hydraulic pump 1 connected to a fluid supply 2 and pumping fluid into a pressure line 3, which is connected to a pressure duct 4 within a housing 5 of control element generally indicated at 6. Housing 5 further includes a bore 7, the terminal part 8 of which connects with a return duct 9 connected to a return line 10 which terminates in fluid supply 2. A duct 11 interconnects pressure duct 4 and return duct 9 and includes a pressure limiting safety valve 12. The bore 7, at the right-hand side of the drawing (FIG. 1) terminates in a chamber 13 which is further connected by means of a return line 14 with the hydraulic fluid supply 2.

Bore 7, which is used to control the pressure of the hydraulic fluid, is used to guide a control piston 15. Slider or piston 15 is the control element of control unit 6; its longitudinal, slidable movement controls the path of the hydraulic pressure fluid. Control piston 15 has a ring-formed notch or groove 16 at its circumference, connected over openings 17 with an internal longitudinal bore 19 forming a chamber 18. Internal bore 19 slidably retains a second control piston 20. A spring 21, seated at one end against a shoulder 22 of longitudinal bore 19 presses the second piston 20 towards chamber 18. The second piston or slider 20 is formed with a longitudinal bore 23, starting at the end adjacent chamber 18 and terminating in an enlargement 24 to receive the spring 21. Additionally, several cross bores 25 extend across piston 20 in the region of the inner end of the longitudinal bore 23 and a fine-control end face 26. The main control piston 15 has its face directed towards chamber 8 seated against a spring 27. The main control bore 7 has a ring-formed groove 28 which terminates in fluid connection with high pressure duct 4. The piston 15 is also formed with transverse bores 29 in the region of the termination of duct 4 with bore 7. Cross bores 29 also terminate, of course, in the longitudinal bore 19. The longitudinal bore 19 of the main piston 15 terminates, together with longitudinal bores 23, 24 of the second control piston 20 in chamber 13 which is connected by means of return duct 14 with fluid supply 2.

A duct 30 connects the ring-shaped groove 28 to a working pressure line 32 which supplies fluid to an operating cylinder 31, in which a piston 34 is located, to control the height of cutting platform 36 on which the mowing or sickle bar arrangements of the harvesting machine are located. The lifting cylinder 31 is pivotally supported on the chassis 33 of the harvesting machine. Piston 34 is connected to a piston rod 35 which, in turn, is swingably connected to the platform 36. Duct 30 includes a check valve, which can open in the direction of the cylinder 31. A pressure chamber unit 38 which, for example, may contain an internal flexible diaphragm movable against the compressible fluid, such as air or nitrogen, is connected to the operating line 32 over a branch duct 39.

Duct 30 is connected to an auxiliary duct 40 which leads to a longitudinal bore 41 in housing 5 of the control unit 6. Bore 41 communicates with an expanded end portion 42 of the terminal chamber 8 of the control bore 7, and has an enlarged chamber 43, connected by means of duct 44 with chamber 13 which, as noted, connects with the return line 14 to fluid supply 2. The longitudinal bore 41, together with a valve body 46 in form of a spool piston forms a valve 45. The spool piston 46 is formed with a ring-shaped recess 47, controlling connection between duct 40 and chamber 13. Spool piston 46 has an extension 48, located in the chamber portion 42, and contacted by a pin 49 connected to control piston 15. The opposite end of the spool piston 46 is formed as a conical valve closure 50, pressed by a spring 51 upon a valve seat 52 in longitudinal bore 41.

The main control piston 15 extends into chamber 13. The end 53, extending into chamber 13, has a fixed pin 54 which bears against a wedge-shaped portion 55 under pressure of spring 27 in chamber 8. Wedge-shaped part 55 is pivoted to an intermediate link 56, secured to a shaft 57 located in housing 5. Shaft 57 is connected to a manually operable lever 58 by an extension leading beyond housing 5 of control unit 6. A second shaft 5, located in housing 5, has a link 60 secured thereto, the free end of which likewise has a pin 61 which extends at the side of the wedge-shaped part 55 opposite the pin 54 secured to the piston 15. The portion of shaft 59 extending beyond the housing 5 is connected to an operating link 62. The other end of link 62 is connected to a pressure-responsive link element 64 by a pivotal connection. The pressure-responsive link 64, at the left side of FIG. 1, includes a pressure piston 65, an enlarged cylindrical part 66 and an extension 67. Extension 67 is pivoted to the end 63 of link 62 and further secured by means of a spring 68, acting as a compensating spring, to the chassis of machine 33. The ring 66 is screwed into a tube 69, in which a pressure cylinder 70 is located, capable of moving lengthwise of tube 69. Pressure cylinder 70 is formed with a flange 71 within the tube 69; the other end 72 of pressure cylinder 70 extends beyond the tube 69. Tube 69 retains a compression spring 73, bearing against flange 71 at one end and against the bottom of tube 69 at the other, and tending to move pressure cylinder 70 inwardly into tube 69. Flange 71 has a projection 74 which is guided in a longitudinal slit 75 of tube 69, the length of slit 75 determining the maximum travel of the pressure-responsive part 64. Piston 65 is located slidably, but fluid-tight within pressure cylinder 70 and defines a pressure chamber 76 therein. Pressure chamber 76, within cylinder 70, is connected over a duct 77 to a control line 78 which, in turn, is connected to the pressure line 32 controlling the cylinder-piton combination 31, 34. The end 72 of the pressure cylinder 70 is pivoted to a connecting link 79, fixedly secured to the structure supporting the cutting platform 36. The cutting platform 36, itself, is swingably mounted by shaft 80 on the chassis of the machine 33 (not shown) in the drawings for simplicity.

Operation with elements of control unit 6 as illustrated in FIG. 1—neutral position: hydraulic pressure fluid is pumped by pump 1 over the pressure line 3 into pressure ducts 4; from duct 4, high pressure fluid is guided to circumferential groove 28, and connected over ring-shaped groove 16 and opening 17 into control chamber 18. Control chamber 18 thus receives sufficient hydraulic fluid under pressure so that the slider or piston 20 is pressed towards the right, in FIG. 1, against the force of spring 21 and out of chamber 18. Cross bores 29 of the control piston 15, as well as cross bores 25 and longitudinal bores 23, 24 of the main piston 20 then lead the pressure medium delivered by pump and supplied over ducts 3 and 4 and ring groove 28, into chamber 13. From chamber 13 the pressure fluid is again returned over return line 14 to fluid supply 2. The valve 37 remains closed and the lifting cylinder 31 will not receive pressure fluid. Valve 45 is likewise closed, so that no fluid medium can escape from pressure cylinder 31 for return over ducts 43-44—chamber 13—line 14—fluid supply 2. The strength of the spring 73 in element 64 (left side of FIG. 1) is so chosen that the pressure cylinder 70, and its projection 74, are approximately central within the slot 75, the pressure cylinder 70 being approximately in the center of tube 69. Piston 65 will be located in such position within cylinder 70 that the counteracting forces of the pressure fluid withing chamber 76 and spring 73 will be in balance. The major portion of the weight of the mowing platform 36 will be supported over the cylinder-piston arrangement 34; the remaining portion of the weight will be supported by sliding on the ground.

Wheat is usually harvested with a harvesting machine sliding over the field in order to cut as many stalk as possible. The portion of the weight of the mowing platform supported by the ground itself is so chosen that the mowing platform will not dig into the soil on the one hand, and on the other, will not be lifted off. The position of the mowing platform is controlled by the manual position of lever 58, and thus the location of wedge 55 and the position of control piston 15. Control of the weight-lifting effect by piston-cylinder combination 31, 34 to a constant value thus also maintains the portion of the weight carried by the soil substantially constant and the cutting platform will slide over, and follow the surface contour of the field being cut.

A rise in the field to be cut will cause the mowing platform to pivot about axis 80, in counter-clockwise direction. This movement will cause piston 34 to slide out of cylinder 31. Pressure in cylinder 31, as well as in pressure chamber 76 will drop. Duct 77, and ducts 78, 32 will transmit such changes in pressure to the control unit 6, as well as to element 64. As the pressure in chamber 76 decreases, the force of spring 73 will exceed the counter pressure in chamber 76 and will press cylinder 70 into housing tube 69; thus piston 69 will extend farther into cylinder, or chamber 76. The length of the pressure-sensitive link 65 is thus decreased. The pressure cylinder 70 is, as has been described, connected to link 79 at its end 72 which, in turn, is connected to the mowing platform 36. The pressure-responsive element 64 thus counteracts initially its own decrease in length due to change in fluid pressure which results from pivoting of platform 36 over shaft 80. The pressure-responsive element 64 is moved as a unit in the direction of spring 68. The movement transferred by the pressure-responsive element 64 to coupling link 62 is not, however, compensated because shortening of the pressure-responsive link 64 pivots coupling link 62 and its shaft 59 also in counter-clockwise direction and thus moves link 60 connected to shaft 59, to the right (FIG. 1). Pin 61 will move wedge 55 about its pivot link 56 in clockwise direction and thus pushes the control piston 15, over pin 54, towards the left and counter the force of spring 27, that is in the direction of chamber 8. The ring-shaped groove 16 will eventually extend into chamber 8 connected to return line 10 over duct 9 and pressure fluid may escape from chamber 18 and flow over ducts 17, groove 16 and return lines 8, 9, 10 into fluid supply 2. Groove 16 is separated from groove 28, connected to the pressure supply 1, 3, 4. Groove 16 is thus without pressure. Spring 21 presses the control slider 20 into chamber 18. Cross bores 25, and the fine-control face 26 of the internal control piston 20 will be out of alignment of cross bores 29 of the main control piston 15, so that the connection from pressure supply circuit 3–4–28–29 is separated from the pressure return circuit 25–23–24–13–14 in neutral position. Pressure supply from pump 1 is conducted from circumferential groove 28 in duct 30 and through the now open check valve 37 and into line 32 and cylinder 31; and further from line 32 over control line 78 and duct 77 into pressure chamber 76. The pressure within lifting cylinder 31, as well as within pressure chamber 76 will increase. As soon as the pressure has reached the desired value, as determined by lever 58, link 65 is pushed out of cylinder 76, that is cylinder 76 is supported at its end 72 on link 79, which now acts as a fixed support, and piston 65 is pushed upwardly by the forces acting to counter the force of spring 73 together with tube 69 secured to the end 66 of piston 65. Coupling link 62, and with it shaft 59 and operating lever 60 are thus turned in clockwise direction. Wedge 55 follows the pin 61 of operating lever 60, since spring 27 in chamber 8 transmits its force over slider 15 and pin 54 on wedge 55 to keep the pins 54, 61, in contact with wedge 55. Piston 15 thus slides in the direction of chambers 13 and eventually reaches neutral position, in which ring groove 16 is separated from chamber 8 and connected to pressure supply ducts 3, 4, by groove 28. Pressure fluid thus again will flow through groove 16 and opening 17 into chamber 18. The forces of hydraulic pressure in chamber 18 may only be small, and yet control slider 20 will be moved against the force of spring 21 to slide the piston 20 out of chamber 18 and to interconnect cross bores 25, 29 of the sliding pistons 20 and 15, respectively. Thus, the neutral fluid circulating path: 1–3–4–28–29–25–23–24–13–14–2 for the pressure fluid is again open. The lifting cylinder 31 again supplies the necessary pressure on piston 34 to support that portion of cutting platform 36 which is not supported by the ground level itself.

If the cutting platform 36 glides into a depression, it will pivot in clockwise direction about shaft 80. Piston 34 will be pressed into cylinder 31, the pressure will increase in lifting cylinder 31 and thus in chamber 76 connected thereto over fluid lines 32, 78, and duct 77. Clockwise rotation of the cutting platform 36 about shaft 80 further causes movement downwardly of the pressure-dependent unit 64 due to its connection with link 79 for a short period; the internal position of element 77, itself, with respect to tube 69 may not change appreciably due to the play permitted by slot 75. The higher pressure in chamber 76 causes greater forces to act on piston 65 and tends to push piston 65 out of chamber 76, moving against the force of spring 73 in tube 69 in an upward direction. Coupling link 62, and its shaft 59, will then swing in clockwise direction, likewise moving link 60 in clockwise direction and pin 61 towards the right. Wedge 55 will follow, as above described, and the piston 15 will be pressed by spring 27 in the direction of chamber 13, that is in the direction of lowering the cutting platform. The control slider 20 will retain its position with respect to piston 15, that is will not change with respect thereto from its neutral position, so that the pressure fluid supplied by pump 1 will be returned to supply 2 as above described. Slider 15, additionally, will cause pressure to be transferred over its projection 49 to end 48 of spool piston 46, to slide piston 46 in the direction of the enlargement 43 within the longitudinal bore 42. Valve element 50 is lifted off seat 52, and pressure fluid will flow from cylinder 31 and pressure chamber 76 through duct 77, lines 78, 32, duct 40, bores 41, 43 and duct 44 into chamber 13 and from there back to return line 14 into supply 2. This causes the pressure in the lifting cylinder 31, and thus in chamber 76 to drop. As the pressure forces decrease in chamber 76 below the force of spring 73, spring 73 will again press tube 69 in the direction towards end 72 of cylinder 70 so that piston 65 secured over ring 66 to tube 69 is again pushed into chamber 76. Piston 65 will move coupling link 62, and with it shaft 59 in counter clockwise direction due to the interconnection at 63. Operating lever 60 will then also swing in counter-clockwise direction, and its pin 61 will move slider 15 counter the force of spring 27 by transfer of force over wedge 55 and pin 54 to extension 53. The slider 15 will return to neutral position, projection 49 thereof extending further into projection 42 and spring 51 may push spool valve 46, and with it valve portion 50 back on valve seat 52. The fluid supply lines 30, 32, are then again separated from the return duct lines 43–44–13–14–2 and the pressure fluid in chamber 76 as well as in lifting cylinder 31 is isolated and can no longer escape. The neutral circulating path for the pressure fluid supplied by the pump is, however, again open.

If the machine is to be controlled such that the cutting platform is in an elevated position, so that the wheat will not be cut directly above the ground, that is, for example, if the wheat is standing straight, and little concern is had for straw, or minor variations due to uneven soil contour are immaterial, then it is not necessary that cutting platform 36 slide over the ground. The entire weight of the cutting platform 36 will then be carried by lifting cylinder 31 and pressure-sensitive unit 64 is not active. Control will entirely be obtained from the position of hand lever 58. Each position of the cutting platform 36 with respect to chassis 33 has a corresponding position of lever 58.

Setting of cutting platform level: movement of hand lever 58 causes motion of wedge 55 downwardly between pins 54 and 61, thus decreasing their distance. Lever 60, together with its pin 61, forms a fixed reference, so that wedge 55 slides along pin 61 and presses slider 15, over pin 54 and extension 53, counter the force of spring 27 towards chamber 8, that is in the direction "lift." As already described further above, the ring-shaped groove 16 of slider 15 will extend into the end chamber 8 of bore 7 and thus connect with return ducts 9, 10. Fluid in chamber 18 of the second slider 20 may then flow over openings 17 and duct 16 into the return circuit, chamber 8, ducts 9 and 10. Spring 21 will tend to push slider 20 into chamber 18, separating cross bores 25 and 29. Pressure fluid from pump 1 then will be supplied through a pressure circuit: 3–4–28–30–37–32 into lifting cylinder 31. Piston 34 will be lifted out of cylinder 31 due to the increasing pressures therein and pivot the cutting platform 36, connected over link 35 in counterclockwise direction. Simultaneously, pressure fluid is conducted over line 77 and control line 38 with chamber 36 connected with duct 32. The increasing pressures in chamber 36 push cylinder 70 counter the force of spring 73 in a direction outwardly of tube 69, until projection 74 on flange 71 of cylinder 70 will engage the end of slot 75 on the side adjacent spring 73. The pressures within chamber 76 and lifting cylinder 31 will be of such magnitude that the entire weight of the lifting cylinder 31 can be supported, and cutting platform 36 will lift off soil level. Upon further increase in pressure, the pressure-responsive unit 64 will no longer be of variable length but will act as a fixed-length stiff link element.

Lifting piston 34 will be slid out of cylinder 31, and cutting platform 36 will pivot counter-clockwise over its pivoting axis 80 until the desired cutting level, or height above ground, and with respect to chassis 33 is obtained. As the cutting platform 36 pivots, the connecting link 79 secured thereto will likewise pivot counter-clockwise and the fixed unit 64, pivoted to link 79 is moved upwardly—link 64 being now stiff and not length-variable— and thus coupling link 62 and with it shaft 69 and lever 60 will rotate in clockwise direction. Spring 27 will retain pin 54 pressed against wedge 55; thus wedge 55, and pin 61 will follow when operating lever 60 swings in clockwise direction, and slider 15 will again be pushed back into neutral position, so that chamber 18 will again be connected over openings 17 and ring groove 16 with groove 28 connected to the pressure supply 3, 4. A low pressure will build up in chamber 18, just sufficient to push slider 20 against the force of spring 21 out of chamber 18 so that cross bores 25 and 29 of sliders 20 and 15 are connected. Pressure fluid supplied by pump 1 will flow over line 3, pressure duct 4 to groove 28 and then again over cross bores 29, 25, 23, 24, into chamber 13 and return line 14.

If a lower cutting height is desired, manual lever 58 is moved in clockwise direction to obtain a new position of the cutting platform 36 with respect to the chassis. Wedge 55 will be lifted by intermediate lever 56 from between pins 54, 61. The distance between pins 54, 61 decreases, that is pin 61 retains its position and slider 15 is pushed by spring 27 in the direction of chamber 13. Pin 54 will move in the direction of pin 61, always in contact with wedge 55. Slider 15 thus again reaches the "drop" position, and hydraulic fluid supplied by pump 1 will flow over the return circuit to supply 2 as described above. Project 49 on slider 15 will open valve 45, again as above described, so that pressure fluid may escape from cylinder 31 into supply 2. Piston 31 will enter deeper into cylinder 34 until the cutting platform 36 has reached the desired position. Movement of cutting platform 36 will likewise move link 79, in clockwise direction, and will cause motion of connecting link 62, by transfer over the still stiff link 64, and thus rotation of shaft 59 and link 60, in counter-clockwise direction. Pin 61 will thus return slider 15 by transfer of force over wedge 55 and pin 54.

The position of cutting platform 36 can thus be set to depend entirely on the position of hand lever 58, so that it will be retained in what might be termed a manual control mode; or, it may be partly supported by the ground and follow the contour of the ground over which the harvesting machine runs in what may be termed the ground support mode. Transfer of the operating mode, that is of adjustment of the height of cutting platform 36 and support of all of its weight independently of the ground, after operating in a partly ground supported mode, merely requires adjustment of hand lever 58 by the operator, to set the desired cutting height and thus the desired position of cutting platform 36 with respect to chassis 33, resulting in a predetermined cylinder pressure in the lifting cylinder-piston arrangement 31, 34. Lever 58 is so arranged that the cutting height will be higher with increase in inclination of lever 58. When lever 58 is approximately horizontal, cutting platform 36 will be partly supported on the ground. A vertical position of lever 58 will then correspond to maximum lift, which may be used during turning, or non-cutting movement of the machine. Thus, regardless of position of the cutting platform 36 during cutting, moving lever 58 into vertical position upon approach of the boundary of the field, will cause a rise in the cutting platform and, even before the harvesting combine has been turned around, cutting platform 36 will be in its maximum lifted position. Moving lever 58 again in the position for the desired cutting height which, for example, can be marked by a stop then brings platform 36 into position for cutting of the next swath.

Various modifications of the invention will now be described, the same elements being given the same reference numerals and several of the elements being shown in highly schematic form, a complete disclosure having previously been given.

Figure 2:
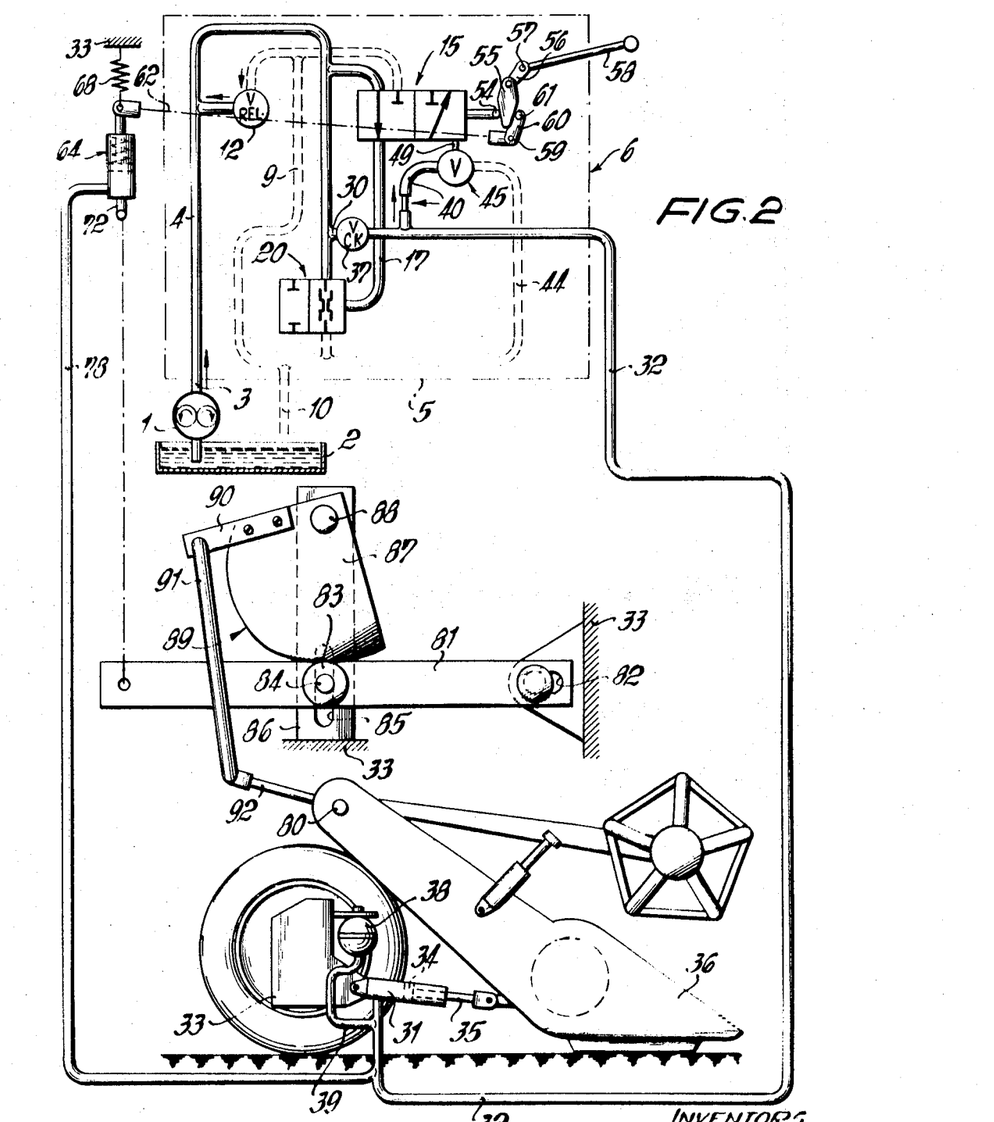
FIG. 2 is a modified embodiment of the structure of FIG. 1, in schematic form.

Referring now to FIG. 2: Control unit 6 and pressure-dependent length-variable element 64 are the same as previously described in connection with FIG. 1. The essential difference is that the elements which are responsive to position of the cutting platform with respect to the chassis (that is, with respect to ground level or ground contour) have been changed. The pressure-responsive unit 64 which, as before, will be a stiff, non-length varying element when the system is in the manually controlled mode, is connected to a lever 81, movably connected to the lower end 72 of pressure cylinder 70. The other end of lever 81 is connected by means of a pin in a horizontal slot 82, cut into a bracket secured to chassis 33. The general arrangement of lever 81 is such that it is essentially horizontal. A roller 83, on a bolt 84 is arranged approximately intermediate the ends of lever 81. Bolt 84 is slidable in a longitudinal slot 85 cut into a vertically extending bar 86 likewise secured to chassis 33. A camming disk 87 is pivoted to bar 86 at a pivot point 88, the roller 83 engaging camming surface 89 formed at the circumference of disk 87. Camming surface 89 has a pair of sections; a first one, in FIG. 2 in engagement with the roller 83, which is substantially concentric to pivot axis 88; and a second one, extending beyond the concentric section and having a gradually decreasing distance from the pivot point, as best seen in the view of FIG. 2. A lever 90 is secured to disk 87, which lever 90 is connected by a link 91 with a connecting arm 92 secured to cutting platform 36. Arm 92 thus has a function analogous to arm 79 of the embodiment of FIG. 1.

If the cutting platform 36 is sliding on the ground, control is obtained similar to the arrangement of FIG. 1, that is over pressure in the lifting cylinder-piston arrangement 34 and the pressure-sensitive element 64 connected thereto. The link elements 81–87–91–92 are not active in this mode, since movement of the cutting platform about the pivoting axis 80, transferred over links 92, 91, 90 to the disk 87 only brings into action the portion of the camming surface 89 which is concentric to pivoting axis 88. Link 81 thus does not change its vertical position. Its left hand in the (FIG. 2) retains the position shown in FIG. 2 and forms a fixed point for end 72 of the pressure-sensitive element 64, being kept in contact with the camming surface concentric with shaft 88 by means of spring 68 lifting upwardly the pressure-sensitive element 64.

Cutting platform 36 may be lifted to assume a cutting level above ground. For this mode of operation, the operator has to lift manual control lever 58 to set the desired cutting height of platform 36 with respect to the chassis 33 and, thus, with respect to ground level. Change of position of lever 58 is transferred over link 56, wedge 55, to slider 15, so that slider 15 will be brought in the "lift" position. Pressure fluid will be admitted to lifting cylinder 31 and likewise into the pressure chamber 76 of the pressure-sensitive element 64. As the hydraulic pressure increases in cylinder 31, cutting platform 36 will lift off the ground until the entire weight of the platform 36 is carried by the cylinder-piston combination 31, 34. At that point, the pressure within the cylinder 31 will be so great that the strength of spring 73 within pressure-sensitive length 64 is exceeded, and element 64 will act as a stiff, non-length variable link. The camming surface 89 of disk 87 is so arranged that the transition point from concentric to gradually decreasing distance from pivot axis 88 occurs just at the point when the cutting platform 36 lifts off the ground. Upon pivoting of the cutting platform, disk 87 (as above noted) will be rotated counter-clockwise by connection with links 92, 91, 90, and the camming surface of gradually decreasing distance from pivot point 88 will be brought in contact engagement with roller 83. Roller 83, upon rolling against the now receding camming surface permits pivoting of link 81 in clockwise direction, so that the left-hand end will move upwardly. Element 64, acting as a stiff link, will move coupling lever 62 to pivot in clockwise direction, thus moving shaft 59 and pin 61 connected to link 60. Spring 27 can then again move the slider 15 so as to return into neutral position as soon as the cutting platform has reached the desired height, as determined by hand control lever 58.

The level of cutting platform 36 can be decreased by moving the lever 58 in clockwise direction. Link 56 and wedge 55 will then cause motion of slider 15 in the "drop" position. Valve 45, controlled by projection 49 of slider 15 will be opened, pressure fluid may escape from lifting cylinder 31 and piston 34 can move in cylinder 31 in a direction to permit pivoting of the cutting platform 36 about pivot axis 80 in clockwise direction. The fixed arm 92 will, thereby, likewise turn disk 87 over links 91, 90 about its pivot point 88. Disk 87, turning in clockwise direction, will control the position of link 81 so that the left-hand end of link 81 moves downwardly, counter the force of spring 68. Slider 15 is returned again into its neutral position over the still stiff link 64 and linkages 62–60–61–55, until the cutting platform 36 has reached the position corresponding to the height determined by the position of lever 58. Valve 54 then again closes and no more pressure fluid can escape from cylinder 31.

The cutting platform 36 is lifted into the transport position in the same manner as described in the embodiment in connection with FIG. 1.

Figure 3:
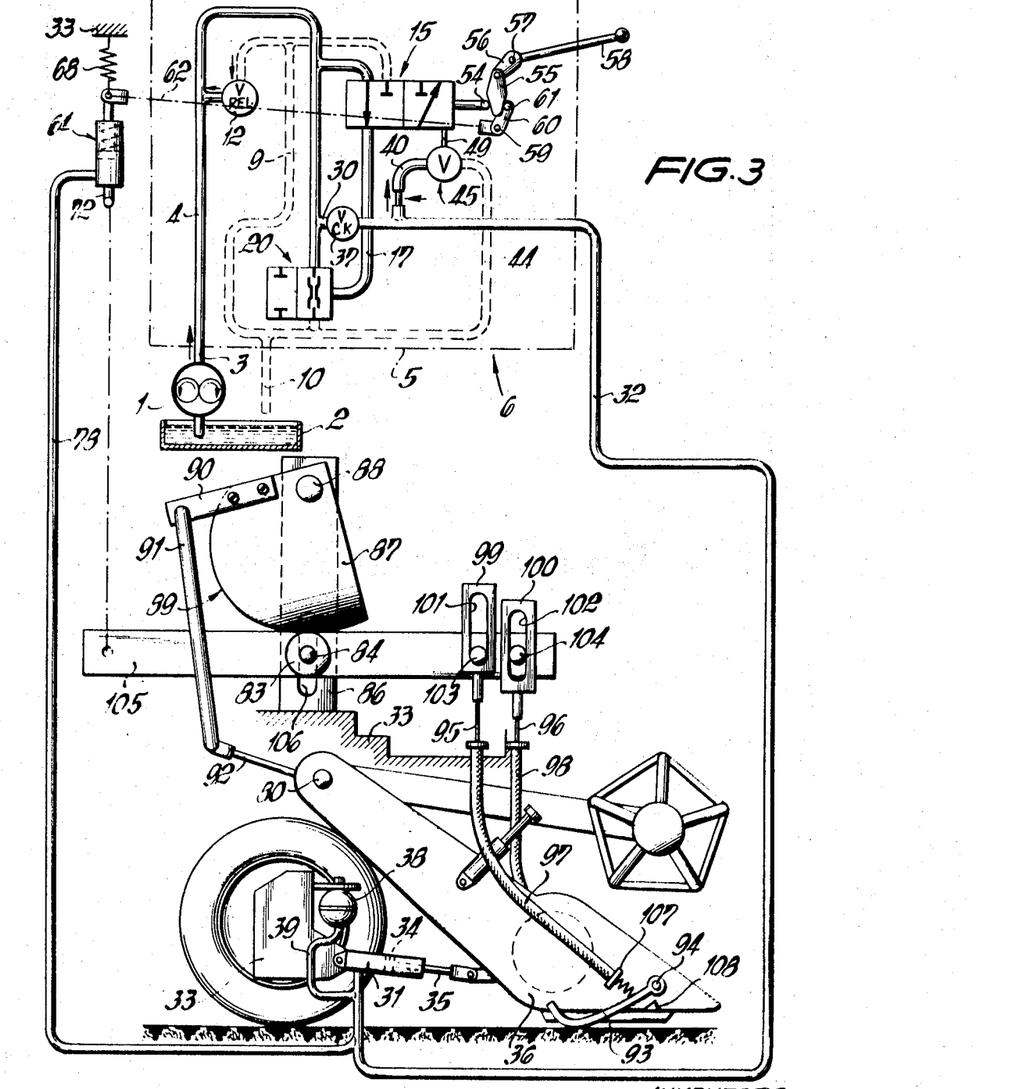
FIG. 3 is a different modification of the structure of FIG. 1 containing soil level sensing arrangements.

Referring now to FIG. 3: the control element 6, and the pressure-sensitive length-variable element 64 are similar to these elements previously described in connection with FIGS. 1 and 2. Likewise, the general arrangement of the linkages 92, 91, 90, and camming disk 88 is similar. The same parts are therefore given the same reference numerals.

The embodiment of FIG. 3 is particularly applicable if wheat is to be cut with even height over the ground, regardless of ground level variations. The feeler arrangement to sense ground level is therefore provided, in order to adjust the level of the cutting platform to an even height. A pair of sliders 93, arranged at both sides of cutting platform 36, are pivoted to the cutting platform at 94 and engage the ground level to sense the ground contour. Each one of the sliders 93 is connected to the inner element 95, 96 of a Bowden cable, the upper part of the housing tube 97, 98 of which is connected to chassis 33. Each one of the wires 95, 96 of the Bowden cables are connected to a guide link 99, 100, respectively, each having an elongated slot 101, 102, respectively. Bolts 103, 104, connected to link 105, which corresponds to links 81 of FIG. 2, slide in the elongated slots 101, 102.

The left-hand end of link 105 is again pivotally connected to terminal end 72 of pressure-responsive length-variable element 64. Roller 83, as described in connection with FIG. 2, is secured to link 105, to slide in a vertical elongated hole 106. When link 105 is substantially horizontal, bolt 84 will be approximately central of slot 106, and roller 83 engages the portion of camming surface 89 concentric with pivoting axis 88.

The lower ends 107 of the tubes of the Bowden cables are secured to the cutting platform 36. The cutting platform 36 is further provided with stops 108 which limit the counterclockwise rotation of feeler arms 93 upon lifting of the cutting platform 36 beyond a predetermined height.

If cutting platform 36 is to slide over the ground, it is again controlled by the pressure in lifting cylinder 31 and the pressure-responsive element 64 hydraulically connected thereto. The operation is as previously described. Link elements 87, 91, 92 of the position control, and the link elements 93–95–96–99–100 of the sensing control are not used. Likewise, the control possible due to the decreasing distance of the camming surface from pivot shaft 88 is not used, since, similar to the embodiment described in connection with FIG. 2, motion of the links 92, 91, 90 only cause pivoting of camming surface 89 in the region where it is concentric with shaft 88. The ground level sensing sliders 93 will be in their highest position, that is in the position causing links 99, 100 to be high, and the bolts 103, 104 will engage the bottom ends of elongated slots 101, 102. In this operation, link 105 may be considered as being fixed at the right end to the chassis 33. Spring 68 retains, over element 64, roller 83 in contact with the camming surface 89 of disk 87, and link 105 will retain the position shown in FIG. 3 so long as cutting platform 36 is at least partly supported at ground level.

If the operator desires to adjust the cut of cutting platform 36 to a low height, for example 10 cm. above ground level, then lever 58 is again adjusted to its position corresponding to this height above ground. Control unit 6 will again be operated, as previously described and pressure fluid will be introduced into cylinder 31 and into pressure-sensitive element 64. The hydraulic pressure acting on cylinder 31 pushes piston 34 out of the cylinder, in a direction so that the cutting platform pivots about its pivot axis 80 counter-clockwise, thus lifting the cutting elements off the ground. As soon as the entire weight of cutting platform 36 is carried by cylinder 31, that is just in advance of the lift-off of cutting platform 36 from ground, the pressure in cylinder 31 and the pressure chamber 76 of pressure-responsive element 64 will be such that, as already described above, element 64 will again act as a stiff, fixed-length link. Upon further increase in hydraulic pressure, cutting platform 36 will be lifted off the ground until it reaches the desired height above ground level. Ground contour sensing sliders 93 will, however, continue to slide in contact with the ground even after platform 36 has been lifted off ground and the entire weight of the platform is supported by the cylinder-pitson combination 31, 34. The relative motion of the ground sensing sliders 93 and platform 36 is transmitted over the Bowden cable 95, 96 to pull the terminal units 99, 100 downwardly, so that the pivoting point for bolts 103, 104 likewise shift downwardly. Since the lever 105 has its left-hand end pulled upwardly by spring 68, over element 64, roller 83 on lever 105 will remain in contact with the region of camming surface 89 which is concentric to pivoting axis 88. The point of contact of roller 83 and camming surface 89 thus forms a pivot point for lever 105, which will pivot in clockwise direction until bolts 103, 104 again will bear against the lower end of elongated slots 101, 102 of unit 99, 100, which, as has been noted, have moved downwardly corresponding to change in position of the sensing idler 93. The clockwise pivoting of lever 105 about the contact point of roller 83 with camming surface 89 moves the left-hand end of the lever 105 upwardly, thus moving unit 64 upwardly and with it coupling link 62 to pivot shaft 59 and operating link 60 in a clockwise direction. Slider 15 will then, as already described above, be moved in the direction of chamber 13 (that is to the right in FIG. 3) and control unit 6 will revert to neutral position, maintaining the cutting platform 36 in the desired height above ground.

If one of the ground level sensors 93 meets an obstruction, for example, a rise in ground level, shaft 94 will be turned in clockwise direction. As a result, the central wires of the Bowden cables 95, 96 will move guide elements 99, 100 upwardly, thus causing pivoting of lever 105 in counter-clockwise direction over the pivot point defined by roller 83 and camming surface 89. This movement will pull unit 64 which, as before, is a stiff, non-length variable link downwardly, and will move the control unit 6 over linkages 62–60–61–55 into the "lift" position. Hydraulic fluid under pressure will be conducted to the lifting cylinder 31 and cutting platform 36 will be lifted over the obstruction. As soon as both ground sensing sliders are again in their normal position, relative to cutting platform 36, as controlled by hand lever 58, control unit 6 will revert to neutral position in the same manner as described before.

If one of the sliders 93 senses a depression, no change in position of cutting platform 36 with respect to average ground level will result. Both sensing sliders 93 are connected over Bowden cables 95, 97, 96, 98 with lever 105. The particular lever which is higher will form the end bearing point. If one of the sliders 93 pulls the central wire downwardly, as illustrated in FIG. 3 with respect to wire 96, the corresponding guide unit 100 will likewise be pulled downwardly and bolt 104 will no longer bear against the bottom of elongated slot 102. Bolt 103 will, however, be at the lower end of elongated slot 101 in guide unit 99 which is maintained in position by its connection with the associated slider 93 which has not sensed a depression. Thus, minor variations in ground level in a downward direction, not affecting operation of the cutting platform do not affect the average position thereof.

Should both sensors 93 sense a depression in ground level, then both will pull both guide parts 99, 100 downwardly by their connection to the central wires of Bowden cables 95, 96. Spring 68 will pull upwardly at the left-hand end of lever 105 to swing lever 105 about its pivot point defined by roller 83 bearing against camming surface 89 so that lever 105 will swing clockwise, until one of bolts 103, 104 will again bear at the bottom end elongated slots 101, 102. The pivoting motion of lever 105 is transferred over linkages 64–62–60–55, as well as by means of spring 27 within control unit 6 so that control unit 6 will change its position to the "drop" operation. Pressure fluid may now escape from lifting cylinder 31, as previously described, and the cutting platform 36 will be lowered until it has reached its position relative to the sensing sliders as determined by lever 58 or until sliders 93 return to their normal position for level ground and return the hydraulic unit into neutral position, as above described.

It is possible that cutting platform 36 may meet an obstruction located between the two sensors 93, for example if the cutting platform is set for a very low level above ground. Pressure-dependent regulation is still automatic. A portion of the weight of platform 36 is carried by the ground, so that pressure within cylinder 31 and chamber 76 drops to the point that the pressure-responsive unit 64 will no longer be stiff and length-invariable, but rather become length-variable, dependent on pressure within cylinder 31, and control the position of control unit 6 to change into the "lift" mode. Pressure fluid will then again be supplied to cylinder 31, as above described, and cutting platform 36 will be lifted above the obstruction.

Wheat can also be cut at a level which is above the length of the feelers 93 engaging the ground. For such regulation, lever 58 is moved to the corresponding level which, as already above described, will regulate the level of cutting platform 36 with respect to chassis 33. When the cutting platform 36 is lifted to a new position, feelers 93 will eventually hit the stops 108 provided on cutting platform 36. Guide units 99, 100 will also form fixed pivot points at their lowest ends, when in the final position defined by stops 108. Roller 83 will then slide along the camming track 89 in the region of decreasing distance from shaft 88, as determined by the interconnection of linkages 90–91–92. Depending upon the position of cutting platform 36 with respect to chassis 33, roller 83 will glide along the various points of camming surface 89, farther or closer to pivot axis 88, and which, considering the particular position of lever 58, brings the control element 6 into neutral position. Deviations of the position between roller 83 and pivot axis 88, corresponding to neutral position, are transferred over lever 105 and linkages 64–62–60–55 to the control unit 6 which will be placed into the "lift" or "drop" mode of operation so that cutting platform 36 will be placed in the proper position corresponding to the position of hand lever 58. As soon as this position is obtained, control unit 6 is again placed into the neutral position over the various links as previously described.

Cutting platform 36 is lifted into the transport, that is highest position in a manner which is similar to that described in connection with FIG. 1.

Figure 4:
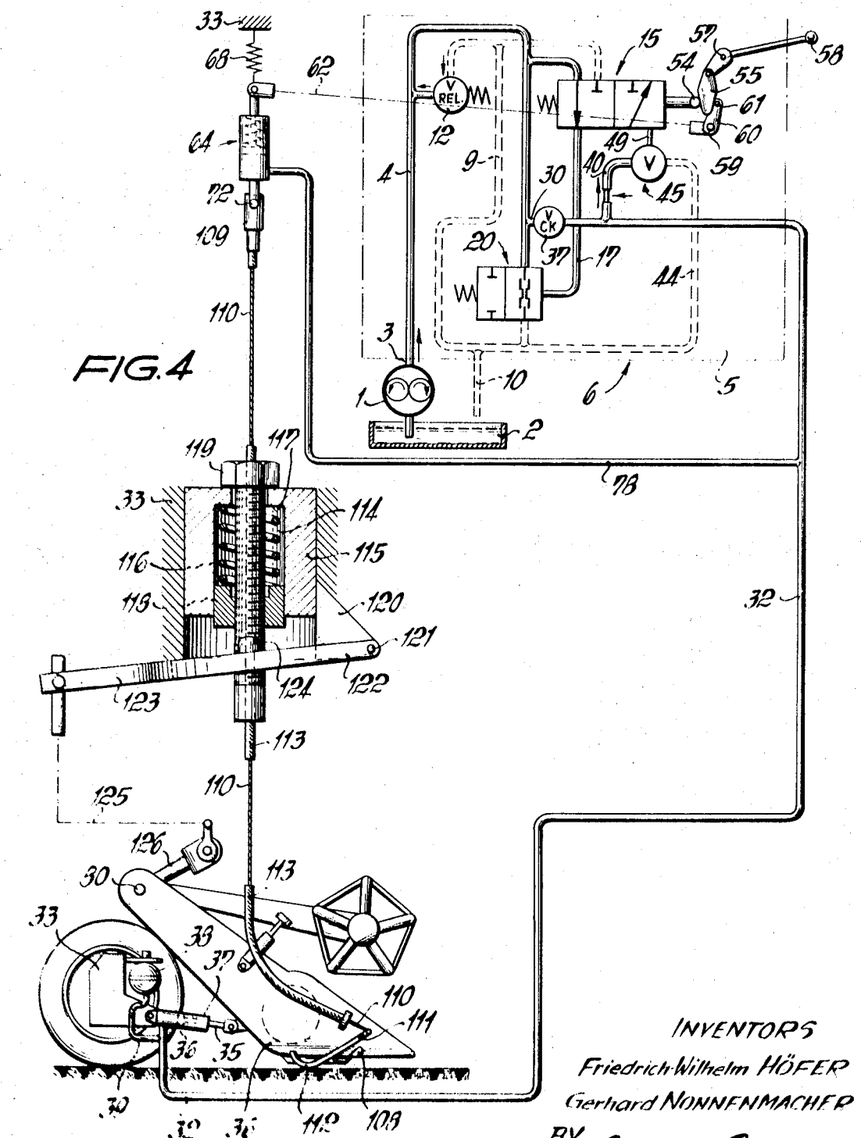
FIG. 4 is a modification of the structure of FIG. 3.

Embodiment of FIG. 4: control element 6 and pressure-responsive unit 64 are as described in connection with FIGS. 1 to 3. The difference between FIGS. 3 and 4 is, essentially, in the transfer of ground level sensing information. The lower end 72 of the pressure-responsive unit 64 is connected to the upper end 109 of the central wire 110 of a Bowden cable. The lower end of the central wire 110 of the Bowden cable is connected to a ground feeler 112 pivotally secured to cutting platform 36 by a shaft 111. The outer covering 113 of the Bowden cable is conducted through an opening in a housing 115, secured to chassis 33, and containing a spring chamber 114, in which a spring 116 is located which, at one end, is supported from a shoulder 117 of the spring housing 115 and at the other end against a holding nut 118 screwed unto the outer covering 113 of the Bowden cable. The end of the housing 113 of the Bowden cable extending out of the spring housing 115 is closed off by a nut 119, bearing against spring housing 115 and thus preventing spring 116 from pushing the housing 113 out of the spring chamber 114.

A pair of flanges 120, secured to spring housing 115 rotatably support a shaft 121. The legs 122 of a forked lever 123 are connected to shaft 121 in such a manner that shaft 121 will form a pivot axis for the forked lever 123. Each of the legs 122 carries a bolt 124, having a rounded end, which extends into the region of adjustment of nut 118. The end of the lever 123 is connected with one end of a link 125, partly schematically indicated, the other end of which is pivotally connected to an arm 126 fixed to the cutting platform 36.

When cutting platform 36 slides over the ground, control unit 6 will cause the lifting pressure in lifting cylinders 31 to carry a portion of the weight thereof in the same manner as above described. Increased pressure in cylinder 31 will be applied likewise to the pressure chamber 76 of unit 64. The hand lever 58 may again set the cutting platform above ground with clearance controlled by ground feeler 112, or higher and independently of the ground. Hydraulic control unit 6 is brought into the "lift" position to lift cutting platform 36 by applying pressure into cylinder 31 to lift the platform 36 slightly off ground level. Fluid under pressure is introduced into cylinder 31, similarly increasing pressure within pressure chamber 76 of unit 64 thus exceeding the strength of spring 73, as above described, and the previously pressure-responsive unit 64 becomes a stiff length-invariable displacement transmission element, when lifting cylinder 31 supports the entire weight of the cutting platform 36. The ground feelers 112 will pivot in counterclockwise direction upon lifting of the cutting platform. This pivoting motion causes movement of the internal wire 110 of the Bowden cable, permitting the now length-invariable element 64 to be pulled upwardly by spring 68. The linkage element 62–60–55 connected to unit 64 will control the position of the slider within the control unit 6 in such a manner that it will return to neutral position when the cutting platform 36 has reached the desired level.

If the feelers 112 meet an obstruction, pivoting in clockwise direction about their axis 111 will cause downward motion of the internal wire 110 of the Bowden cable. Linkages 64–62–60–55 will transfer motion to control unit 6 to change the operation into the "lift" mode and the cutting platform 36 will be lifted over the obstruction, as above described. If, after the obstruction has been passed, the feelers 112 again return into the position corresponding to the level previously commanded, sliders 15, 20, also as above described, will return the hydraulic control unit 6 into neutral position.

If feelers 112 drop into a depression, then they will first cause a sensed mechanically transmitted signal to the control unit 6 to drop the cutting platform and, after the correct level has again been established, unit 6 will revert to neutral position.

The cutting platform 36 will, also in this mode of operation, when part of its weight is carried by the ground, be subject to pressure-responsive control.

The cutting level can also be set to be above the range of regulation obtained by the ground feelers 112. It is only necessary for the operator to move manual control lever 58 into the position corresponding to desired cutting height. Feelers 112 will then, again, reach a terminal position set by stops 108 on the cutting platform 36 and will have no further function. Arm 126, secured to the cutting platform 36, will push lever 125 upwardly, thus moving the forked lever 123 in clockwise direction about shaft 121, journalled in flanges 120. Bolts 124, located on the legs 122 of lever 123, will then press against nut 118, to depress spring 116 and press nut 118 into the spring chamber 114. The outer covering 113 of the Bowden cable is carried along by the nut 118. Since, after feelers 112 are against stop 108, no more relative motion of internal cable 110 and housing 113 of the Bowden cable will occur, they will act also as a stiff, motion-transmitting element, and spring 68 will pull the internal wire 110, over connection of unit 64, upwardly in direct correspondence to motion of the outer housing 113. Unit 64 will, of course, likewise move upwardly, causing coupling lever 62 to move shaft 59 in clockwise direction, and thus return of control unit 6 again into neutral position as soon as the platform 36 has reached the desired level, as determined by the position of lever 58. If the cutting level should change during operation, for example increase above the position set by lever 58, platform 36 will swing in a counter-clockwise direction about pivot axis 80. Connecting lever 126 will push linkage 125 upwardly, causing further motion of the nut 118 inside of spring chamber 114. Unit 64, connected to the Bowden cable, is further moved upwardly and lever 60 is again further pivoted in clockwise direction. Spring 27 will press the slider 15 into the "drop" position. Projection 49 will open the valve 45 permitting pressure fluid to flow into the supply 2, as detailed above, and cutting platform 36 will again return to the height commanded by the control unit 6, and transferred over linkages 126–125–123–124–118–113–110–64–62–60–55.

If the cutting platform drops below the level desired, slider 15 will move in the opposite direction and will be pushed from neutral position into the "lift" position. Cutting platform 36 will be raised and, as soon as the position of platform 36 with respect to the chassis 33 is obtained, sliders 15, 20 will again return to neutral position. The cutting platform can be brought into transport, that is maximum lift position in the same way as explained in connection with the examples shown in FIGS. 1–3.

Figure 5:
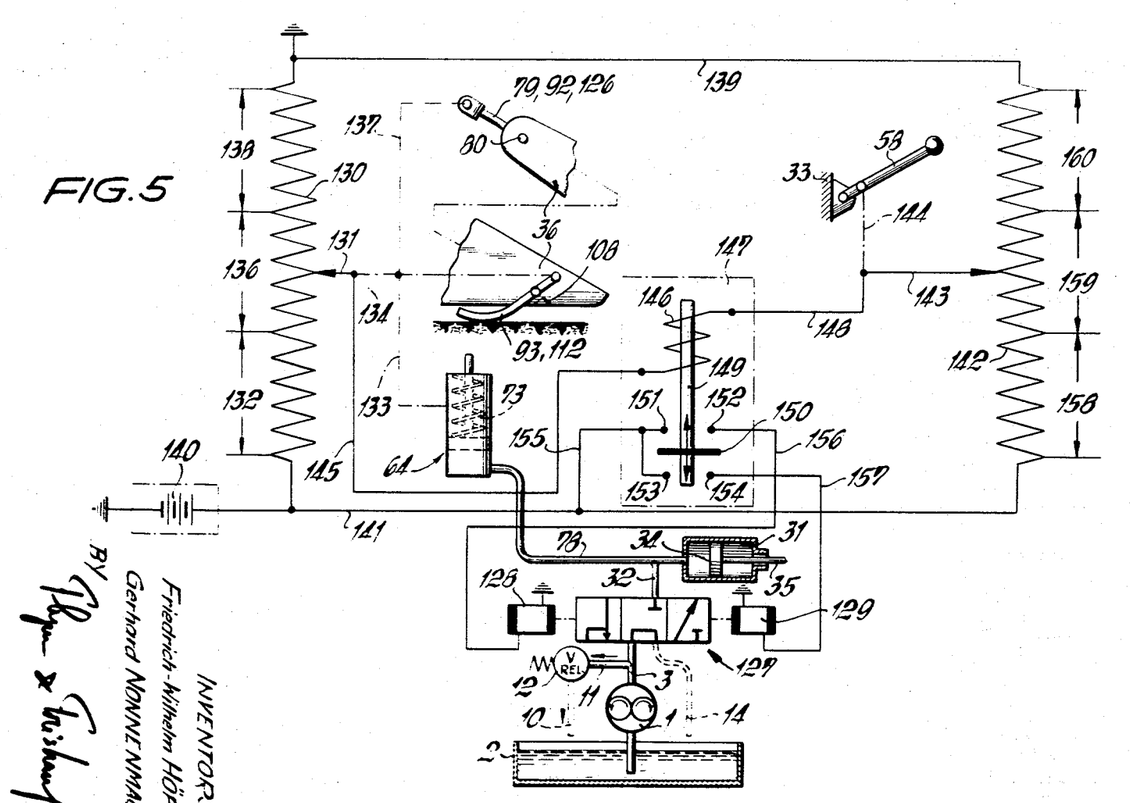
FIG. 5 is a schematic representation of the control system for any of the foregoing structures, using electrical control.

Referring now to FIG. 5: the pressure-responsive element 64, feelers 93 or 112, and the position-responsive element 92 or 126 may be similar to the same elements described in connection with FIG. 3 or 4. Instead of the mechanical linkages serving as transfer elements for the various control parameters, an electrical circuit can be used. All elements which are similar to those previously described have been given the same reference numerals and will not be described again unless necessary for an understanding of the present embodiment.

Pump 1 is connected over pressure line 3 with a control slider 127. A duct 11, with an overpressure safety valve 12 interconnects duct 3 and return line 10, which terminates in a supply 2 in which further a return line 14 connected to the control slider 127 is connected. In the central, or neutral position of the control slider 127, pressure line 3 is connected to the return line 14 over the control slider. The line 32, leading to the lifting cylinder from control slider 127 is closed off in the neutral position of slider 127, control slider 127 is connected to a pair of magnetic control coils 128, 129; control coil 128 controls motion of the slider into the cutting platform raising position, whereas coil 129 controls the lowering of the cutting platform. In the lifting mode, control slider 127 interconnects pressure line 3 with line 32 and closes off return line 14; in the lowering position, control slider 127 shifts and interconnects pressure line 3, as well as line 32 (and thus piston 31) with the return line 14.

Spring 73 of the pressure-responsive unit 64 is connected to an electrical position transducer, for example a potentiometer formed of a resistance 130, and a slider 131, so that the position of the slider 131 will correspond to the actual pressure in the element 64. Changes in length of unit 64 will change the position of slider 131 with respect to resistance 130 within a first region 132. Spring 73 of the pressure-responsive element 64 is, to this end, connected to a motion transfer unit 133, which may be a linkage or a single lever, pivotally connected to slider 131 by an intermediate link 134, so arranged that slider 131 can be moved by link 134 only in the region 132 of the potentiometer 130. The potentiometer 130 is further made responsive to the position of the ground feelers 93 or 112; ground feelers 93, 112, are connected by means of a link 135 to link 134 in such a manner, that change of the position of the feelers with respect to the cutting platform causes change of the position of the slider 131 in a second region 136 of potentiometer 130. The position of the cutting platform 36 can further control the position of the slider 131, the cutting platform 36 having a connecting arm similar to arm 79 (FIG. 1), 92 (FIGS. 2 and 3) or 126, 125 (FIG. 4) connected to a third link 137 which is so interconnected with intermediate link 134 that it will control the position of the slider 131 within a third region 138 of potentiometer 130. Thus, the position of slider 131 can be made responsive to the pressure in the pressure-responsive unit 64, the relative position of ground feelers on the cutting platform, and the position of the cutting platform itself, that is the proportion of weight carried by the lifting cylinder and the ground (if any) respectively.

Potentiometer 130 is connected across a source of electric supply, connected at one end to a chassis and at the other end to a source 140 and a line 141. A second potentiometer 142 is likewise connected across line 141 and chassis, the second potentiometer 142 forming a command unit to command a certain position of the cutting platform. The position of slider 143 on potentiometer 142 is determined by hand control lever 58 over an intermediate link 144. Potentiometer slider 131 is connected to a line 145 and then to a coil 146 of a polarized relay 147 serving as a switching unit. Slider 143 of the command potentiometer is connected over line 148 to the other termnial of coil 146 of relay 147. Relay 147 has an armature 149 on which switching contacts 150 are located which, if both sliders 131, 143 of the potentiometers are in the central position illustrated in FIG. 5, will be located between a pair of contacts 151, 152 and 153, 154, as shown in the drawing. Contacts 151 and 153 are connected to line 155 and then to the line 141 and thus to the source 140; contact 152 is connected over line 156 to the control magnet coil 128; and contact 154 is connected over line 157 to the magnet control coil 129. Thus control slider 127 is magnetically controlled by energization of lines 156, 157.

Command potentiometer 142 has three resistance ranges 158, 159, 160, which correspond to the resistance ranges 132, 136, 138 of the actual value potentiometer 130. Slider 143 of the command value potentiometer is placed in the position of the range 158 when the pressure within cylinder 31 partly supporting the cutting platform 36 should be controlled to a fixed, predetermined and invariable value. Control region 159, adjoining region 158 on resistance 142 corresponds to a slider position 143 in which the cutting height of the cutting platform is determined by the position of feelers 93, 112. The final region 160 of potentiometer 142 corresponds to a slider 143 position in which the level of the cutting platform 36 is controlled to be relative to the level of the chassis 33, independent of ground or weight distribution. The topmost position of lever 58, corresponding to the end position of slider 143 on potentiometer 142, that is at the end region of 160 corresponds to the top or transport position of the cutting platform 36. Slider 131 of the actual-value potentiometer will then likewise move into the final terminal position within region 138 of potentiometer 130.

It is of course possible to omit control of feelers 93, 112 and thus utilize control only based on pressure and position, as described in detail in connection with FIGS. 1 and 2.

The operator selects the desired cutting height by positioning lever 58. This moves slider 143 of the command value potentiometer, for example into the position shown in FIG. 5, that is substantially central of potentiometer 142 and within the range in which feelers 93, 112 will effect control function. Let it be assumed that the cutting platform 36 previously was in its uppermost, that is transport position, so that slider 131 of the actual-value potentiometer is in its upper terminal position, so that a difference in position between slider 131 and slider 143 obtains, the difference commanding a lowering of the cutting platform. A potential difference will obtain between sliders 131 and 143, since the potential at slider 143 will be different from that at slider 131 at resistance 130. The different potential causes current to flow from slider 131 of the actual-value potentiometer to slider 143 of the command value potentiometer, and lines 145, relay coil 146 and line 148 will be energized. A magnetic field will build up in coil 146, and the armature 149 will move away from, or out of coil 146, causing closing of bridge contact 150 on contacts 153, 154. Coil 129 will be energized, causing control slider 127 to move to the right (FIG. 5) due to connection with line 157, 155, 141 to source 140. Slider 127 will be moved into the "drop" position so that line 32, connected to piston 31 will be opened towards the return line 14, and pressure line 3, supplied by the pump will likewise be connected to line 14. Pressure fluid will flow out of cylinder 31 into suply 2. Cutting platform 36 will drop. Simultaneous with motion of the cutting platform, link 92 (or 126) connected to the platform 36 will act over the third link 137 to control slider 131 of the actual-value potentiometer to move in the downward direction (FIG. 5). Since the position of slider 143 of the command value potentiometer corresponds to a position of level of the cuting platform which is within the region of control by the feelers, slider 131 wil move through the entire region 138 of potentiometer 130, corresponding to the cutting platform position depending on level only. There still will be a difference in potential between sliders 131 and sliders 143 when slider 131 has reached the inner end of region 136. Coil 146 of relay 147 will continue to remain activated and control slider 127 will remain in the "drop" position. The cutting platform 36 will now move into the region in which the level of the position is determined by control from the feelers. Further tilting movement of levers 92 (or 126) does not have any more effect on the third lever 137; the feelers 93 (or 112), however, now control the second link 136 and link 134, connected to slider 131 to move slider 131 into region 136 of potentiometer 130. When slider 131 has a position on potentiometer 130 which corresponds to that of slider 133, so that there is no difference in potential, the magnetic field of coil 146 will collapse since no further current will flow through the potentiometer. Armature 149 and contact bridge 150 will return to central position. Contacts 153 and 154 will be separated so that magnetic coil 129 is removed from the circuit and control slider 127 returned into neutral, or central position. In the neutral position, slider 127 again separates the cylinder 31 from the hydraulic circuit, so that no more hydraulic fluid can escape and cutting platform 36, having now reached the desired level, will remain therein. The position of the cutting level will correspond to that of the manual lever 58, controlling slider 143 and the follower 131.

If feelers 93 (or 112) meet an obstruction and are pressed in the direction of the cutting platform, that is upwardly, they will move the ink 135, to which linkage 134 is connected and thus move slider 131 over resistance 130 out of the position corresponding to that of slider 143. Thus, the position of the slider on potentiometer 130 has changed with respect to the value determined by the position of manual control lever 58, and thus of slider 143 so that an error signal is obtained due to the difference between actual value and commanded value. A potential difference again arises between sliders 131 and 143 and, as a result, current will flow through the coil 146. The current will be in opposite direction to that discussed in connection with the setting on the cutting level, causing coil 146 to pull armature 149 of relay 147 into the coil, so that bridge 150 will interconnect contacts 151 and 152. Coil 128 will be energized over lines 156, 155, 141, and control slider 127 brought into the position corresponding to raising of the cutting platform. Pressure fluid from pump 1 applied over line 3 into line 32 of the pressure cylinder 31, and cutting platform 36 will be raised. Feelers 93 (or 112) further slide on the ground but are pivoted in counter-clockwise direction, that is away from the bottom of the cutting platform. This pivoting motion resets slider 131 again to be in the same position as slider 143 on the command potentiometer, so that the voltage difference on the two sliders 131, 143, will be zero. No more field will be available from coil 146 to pull armature 149, and with it bridge 150 in a direction to interconnect contacts 151, 152, the armature will revert to central, open position and coil 128 will be disconnected, causing return of the hydraulic control slider 127 into its neutral position, in which it isolates line 32 and cylinder 31 from the pump, as well as from the pump return line. As a result, cutting platform 36 will remain in the commanded, desired height level.

The level of cutting platform can be set entirely in dependence on the wishes of the operator. Setting of lever 58 to a desired cutting level simultaneously sets slider 143 of the command potentiometer on the desired range of potentiometer 142. Any difference in position between slider 143 and slider 131 of the actual-value transducer potentiometer 130 will cause a voltage difference, causing a current flow of such magnitude or direction through coil 146 of relay 147 that solenoid coils 128, or 129, respectively, will be energized to move the hydraulic control slider 127 into the respective lifting, or lowering position. It can be seen, therefore, that the hydraulic-electrical apparatus acts as a servo arrangement, controlled by the error signal arising due to differences in the manually controlled position, given by hand lever 58, and slider 143 coupled thereto on the one hand, and the actual position of an element sensitive to pressure in unit 64, a ground feeler 93 (or 112), or the position of the cutting platform 36 with respect to the chassis as determined by the position of arms 79, 92, 126.

Figure 6:
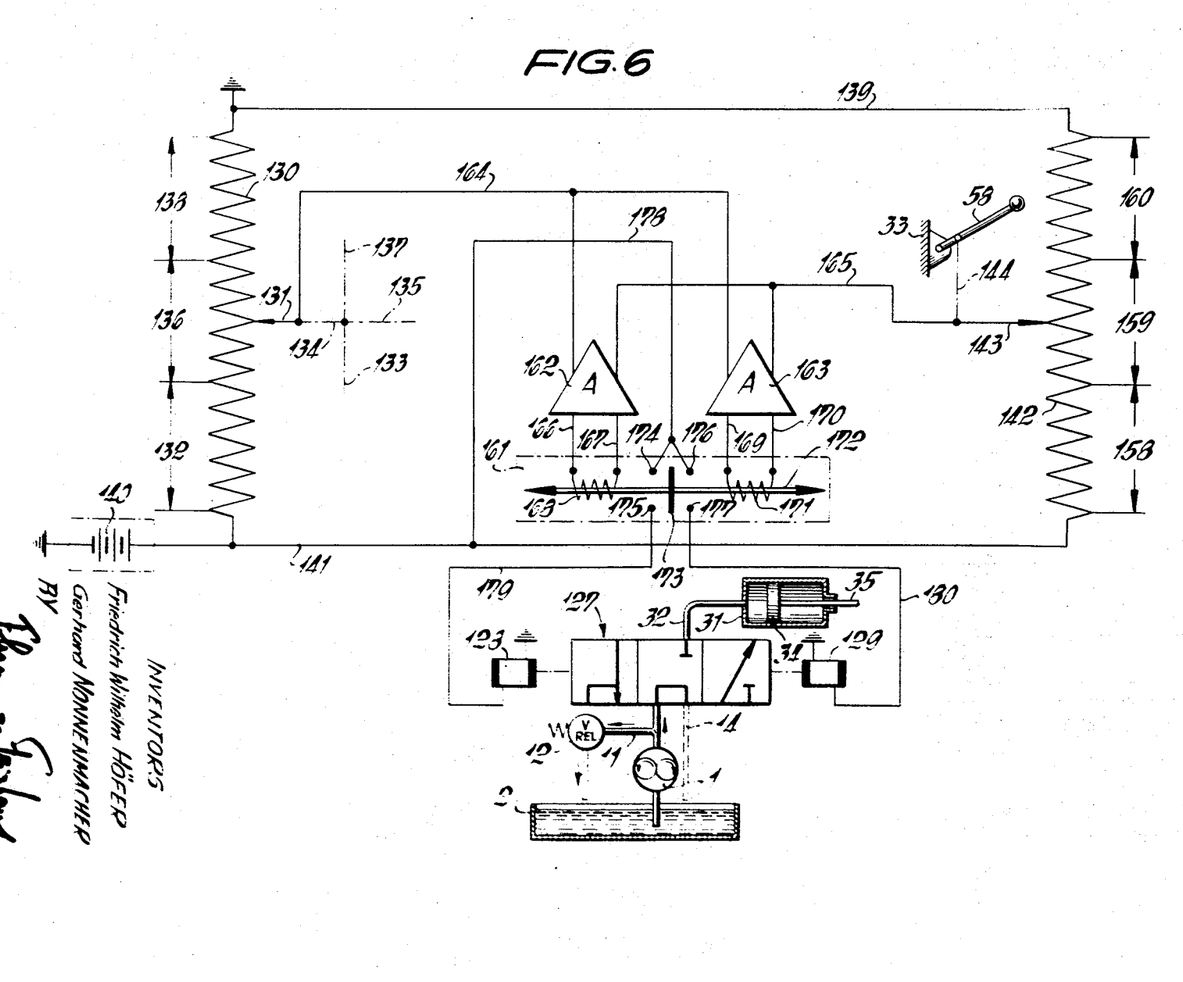
FIG. 6 is a schematic representation of a different embodiment of an electrical control arrangement.

Embodiment of FIG. 6: the control parameters can be applied in different ways to the hydraulic control slider 127; FIG. 6 illustrates a different embodiment of the electro-hydraulic servo arrangement, in which parts otherwise identical to those discussed in connection with FIG. 5 have been given the same reference numerals.

A polarized relay 161 has two amplifiers 162, 163, connected to relay coils 168, 171 of relay 161. Slider 131 of the actual-value potentiometer 130 is connected over a line 164 to a pair of parallel amplifiers 162, 163; slider 143 of the command potentiometer 142 is connected to amplifiers 162, 163, over line 165. Amplifier 162 is connected over lines 166, 167 to coil 168, and amplifier 163 is connected over lines 169, 170 to coil 171. Relay 161 has an armature 172, to which a switching bar is centrally connected, normally disconnected from two contact pairs 174, 175 and 176, 177. Contacts 174, 176 are connected over line 178 to power supply bus 141. Contact 175 is connected over line 179 to solenoid 128; contact 177 is connected over line 180 to the other solenoid 129 which is used to command the lowering of the cutting platform.

The operation of the system in accordance with FIG. 6 is similar to that of the system of FIG. 5; amplifiers 162, 163, and relay 161 are so connected that coil 168 of the relay will pull in the armature only when the slider 143 of the command value potentiometer is displaced with respect to slider 131 of the actual-value potentiometer in a direction commanding lift; conversely, coil 168 of relay 161 will pull in the armature towards the left (FIG. 6) only when slider 143 is displaced with respect to slider 131 in a direction to depress the cutting platform.

The transducers 130, 142, which have been illustrated as potentiometers in FIGS. 5 and 6, may of course also be replaced by other electronic circuit transducing elements, such as, for example, strain gauges, inductive transducers or the like. The use of an arrangement in accordance with FIG. 6 has the advantage that the amplifiers may be sensitive differential amplifiers which can detect small differences between potentiometer sliders 131, 143 and thus provide for accurate positioning of the cutting platform without lag or backlash. Such amplifiers, particularly transistorized equipment, require little operating power yet can control hydraulic sliders which, in turn, can control power equipment at substantial pressures.

The present invention, to adjust and control the position of a harvesting machine cutting platform, on the ground or above ground, has been described in connection with a hydraulic lifting piston and cylinder, controlled either entirely by the weight distribution of the cutting platform on the ground and with respect to the chassis, with its position determined by a manually settable control lever. Additionally, if the platform is to be carried at a small level above ground, feelers can be used to sense ground contour, obstructions, and the like. Hydraulic servo apparatus can then be used to actually carry part, or the entire weight of the cutting platform, depending on the mode of operation, and the setting of the control lever. Feedback of the operating characteristics from the cutting platform is obtained by use of an element, the length of which varies in response to pressure in the hydraulic lifting circuit, and by a second element supplying information regarding the level, or position of the cutting platform wtih respect to the chassis. Information regarding the pressure in the hydraulic system, as well as the position of the cutting platform with respect to the chassis, or, if desired, additionally the position of ground feelers with respect to the cutting platform, is obtained directly by linkages or mechanical connections, or may be obtained by other position and pressure transducers, for example electrical potentiometers. Various changes and modifications may be made in the structures within the scope of the inventive concept.

What is claimed is:

1. Lifting apparatus for raising and lowering the position of a cutting platform (36) on harvesting machines having a hydraulic pump (1) and a return reservoir (2), comprising a manually settable setting lever (58) to set the vertical adjustment of the cutting platform with respect to the chassis (33) of the machine;

a lifting cylinder-piston assembly (31, 34) being connected to the chassis of the harvesting machine, and to the cutting platform, respectively, to support at least part of the weight of the cutting platform of the machine;

hydraulic control means (6) connected to said cylinder-piston assembly and to said setting lever (58) and operative to control the raising and lowering of the cutting platform, said control means being responsive to the position of said setting lever (58) and to the hydraulic pressure in the cylinder-piston assembly (31, 34);

and fluid connection means including a pressure line interconnecting said control means (6) and said pump, an operating line interconnecting said control means and said cylinder-piston assembly and a return line; and, linkage means interconnecting said control means (6), the cutting platform (36) and the setting lever (58) to control the position of the cutting platform with respect to the machine, said linkage means including a first variable link element (64, 130, 132, 131) connected to said hydraulic operating line (32, 78), said first link element having a characteristic which is controlled by and varying in response to pressure changes in said cylinder-piston assembly (31, 34);

said linkage means further including a second variable link element (79, 92, 91-87-83-81, 126; 130, 137, 138) said second variable link element being connected to said cutting platform (36) and having a characteristic which is controlled by and varying in response to the position of said cutting platform (36) with respect to the chassis of the machine.

2. Apparatus according to claim 1, wherein said first variable link element (64) is a length-variable link, a train of linkages (62, 60, 61, 55) interconnects the control means (6) and the cutting platform, and said first variable link element forms part of said linkage train.

3. Apparatus according to claim 2, wherein said length-variable link element (64) includes a cylindrical housing (69), a pressure cylinder (70) resiliently supported in said housing, said cylinder being formed with a pressure chamber (76) interconnected with said operating line (32, 78) to interconnect said pressure chamber and the lifting cylinder-piston assembly (31, 34);

a piston (65) in said pressure cylinder, said piston being connected to said train of linkages.

4. Apparatus according to claim 1, wherein (FIG. 2) said second variable link element comprises a linkage arm (92) fixedly secured to said cutting platform (36) at one end, and directly and movably connected to said first variable link element at the other end, whereby change of position of the cutting platform will vary the position of said linkage arm and the transfer of motion by said linkage means.

5. Apparatus according to claim 2, wherein the second variable link element includes an elongated transmission arm (81) having one end swingably supporting said length-variable link element (72, 64) and the other end movably supported on said machine (33);

and a camming surface-cam follower combination (83, 87, 89, 91, 92) interconnecting an intermediate point on said elongated transmission arm (81) and said cutting platform.

6. Apparatus according to claim 5, wherein the camming surface (89) includes a circular section and an adjacent section having a progressively decreasing distance from the center of said circular section, the changeover between said sections corresponding to the position of said cutting platform at which the entire weight of the cutting platform is just supported by said cylinder-piston assembly and no more weight of the cutting platform is supported by the ground.

7. Apparatus according to claim 2, wherein the cutting platform is provided with ground-engageable ground contour sensing means (93) and providing a ground level output signal;

and wherein the second variable element includes an elongated transmission arm (105) having one end swingably supporting said length-variable link element (72, 64), the other end of said elongated transmission arm being interconnected (95, 99, 96, 100, 101, 102, 103, 104) with said ground contour sensing means and changing in position in dependence on said output signal;

and a camming surface-cam follower combination (83; 87, 89, 91, 92) interconnecting an intermediate point on said elongated transmission arm (105) and said cutting platform.

8. Apparatus according to claim 7, wherein the camming surface (89) includes a circular section and an adjacent section having a progressively decreasing distance from the center of said circular section, the changeover between said sections corresponding to the position of said cutting platform at which the entire weight of the cutting platform is just supported by said cylinder-piston assembly and no more weight of the cutting platform is supported by the ground.

9. Apparatus according to claim 2, wherein the cutting platform (36) is provided with a ground-engageable ground contour sensing feeler movably supported on said cutting platform;

and said second variable link element includes a Bowden cable (110) secured at one end to said feeler and transmitting sensed movement, the other end of said Bowden cable being connected to said length-variable link element (72, 64); and means (126, 125, 123, 124) movably, resiliently supporting a cover sleeve (113, 118) of said Bowden cable on said machine to control the position of said cover sleeve with respect to said Bowden cable by the position of said cutting platform with respect to the machine and thus the ground.

10. Apparatus according to claim 1, including first electrical transducer means (130, 131) connected to be responsive to pressure changes in said operating line;

said electrical transduced means being further connected to be responsive to the position of said second link element (79, 92, 126) and thus responsive to the position of the cutting platform, said electrical transducer means changing its electrical signal transfer characteristics in response to changes in hydraulic pressure necessary to support said cutting platform;

an electrical position control circuit including second transducer means (142, 143) responsive and coupled to the position of said manually settable setting lever (58); and a comparator (147) and servo control means (147, 127, 128, 129) linking both said electrical position control circuit and said first and second transducer means and comparing actual and commanded position, said servo control means controlling the pressure in said operating line and thus the position of said cutting platform upon deviation of actual from commanded value.

11. Apparatus according to claim 10, wherein the cutting platform (36) is provided with ground-engageable ground contour sensing feelers (93, 112) movably supported on said cutting platform;

said sensing feelers being connected to said first electrical transducer means to change the electrical characteristics thereof within a predetermined range (136) of operation of said first transducer means.

12. Apparatus according to claim 10, wherein said comparator includes differential amplifiers (162, 163) connected to both said first and second transducers;

said servo control means including electro-hydraulic servo controllers connected to said differential amplifiers and controlling hydraulic pressure in accordance with sensed difference between commanded and actual position of the cutting platform.

13. Apparatus according to claim 1, including a pressure chamber (38) partly filled with hydraulic fluid and resiliently mounting said cylinder-piston assembly (31, 34), said pressure chamber being hydraulically connected with an operating supply (9).

14. Apparatus according to claim 1, wherein the hydraulic control means (6) comprises a hydraulic valve block having a first bore (7);

a hollow slider piston (15) having a central bore (19), said hollow piston being slidable in said first bore (7) and being connected to be positioned by said manually settable lever (58);

a control piston (20) slidable in the central bore (19) of said hollow piston (15);

hydraulic connection openings (17) interconnecting said first bore (7) and said central bore (19) to move said control piston (20) into one, or another terminal position within said central bore upon pressure changes in said first bore (7);

at least one groove (16) formed in the outer surface of said hollow piston (15), said groove (16) and said hydraulic connection openings (17) interconnecting the interior of said first bore (7) with a return line (8, 9, 10) to the hydraulic pump (1), said connection openings (17) being located on said hollow piston with respect to said control piston (20) in such position that, when the control piston (20) is in substantially neutral position, the flow opening through said connection openings (17) is greater than when said control piston (20) is in either of said terminal positions, the corresponding flow resistance of said interconnection depending on the position of said control piston.

15. Harvesting machine having a chassis, a cutting platform, and a hydraulic piston-cylinder combination at least partly supporting said cutting platform;

a manually settable lever (58) to control the position of said cutting platform (36) above ground level and with respect to the chassis of said machine;

means (6) controlling supply of hydraulic fluid under pressure to said piston-cylinder combination, said fluid supply control means being connected to said manually settable lever to control the flow of hydraulic pressure fluid; an operating line interconnecting said fluid supply control means hydraulically with said piston-cylinder combination;

pressure-sensing means (64) sensing pressure in said operating line (32) and providing a pressure output signal, said pressure output signal being representative of the proportion of weight of said cutting platform supported by said piston-cylinder combination;

position-sensing means connected to said cutting platform and providing a position output signal, said position output signal being representative of the position of said cutting platform with respect to the chassis of said machine;

said pressure-sensing means and said position-sensing means being connected to said hydraulic fluid supply control means (6) to additionally control the flow of hydraulic pressure fluid to said operating line, said pressure output signal and said position output signal providing a feedback to said control means, so that said control means will be automatically responsive to error between the position commanded by said lever and the actual platform position.

16. Harvesting machine according to claim 15, including ground level sensing means supported on said platform and engageable with the ground within a predetermined range of lift of said platform above the ground, and providing a level output signal representative of height of the cutting platform with respect to the ground within said predetermined range;

said level sensing means being additionally connected to said hydraulic fluid supply control means to additionally control the flow of hydraulic pressure fluid to said operating line, said level output signal providing an additional feedback signal to said control means so that said control means will be automatically responsive, additionally, to error between the position, within said predetermined range, commanded by said lever and the actual platform position within said range.

17. Harvesting machine according to claim 15, wherein one of said sensing means includes a transducer converting hydraulic pressure to mechanical displacement, said output signal being in the form of length variations.

18. Harvesting machine according to claim 17, wherein said hydraulic fluid pressure control means includes a displaceable fluid control element;

and displacement of said element is mechanically controlled by said transducer.

19. Harvesting machine according to claim 15, wherein one of said sensing means provides an output signal within predetermined ranges of variations of sensed parameters, and an invariant signal when said parameters are exceeded.

20. Harvesting machine according to claim 19, wherein said pressure-sensing means is a length-variable link changing in length as a function of change in pressure in the operating line in a range from partial to complete support of the platform by said cylinder-piston combination and, beyond, said ranges remaining in its final length position and forming a stiff, length-invariable link.

21. Harvesting machine according to claim 15, wherein one of said sensing means includes a mechanical-electric sensed value transducer; an electrical command transducer connected to said mannually settable lever and providing a command signal representative of the setting of said lever;

and said hydraulic fluid suppy controller is an electric-hydraulic servo connected to said sensed value transducer and said command transducer and responsive to an error signal in the output from said transducers.

References Cited
UNITED STATES PATENTS

| | | | |
|---|---|---|---|
| 3,088,264 | 5/1963 | Sallee | 56—210 |
| 3,267,653 | 8/1966 | Dawalt et al. | 56—11 |

LOUIS G. MANCENE, Primary Examiner

J. A. OLIFF, Assistant Examiner